March 21, 1967     C. J. GUSTAFSSON ETAL     3,309,934
GEAR TRANSMISSION OIL PUMP AND COUNTERSHAFT BRAKE MECHANISM
Filed June 10, 1964     3 Sheets-Sheet 1
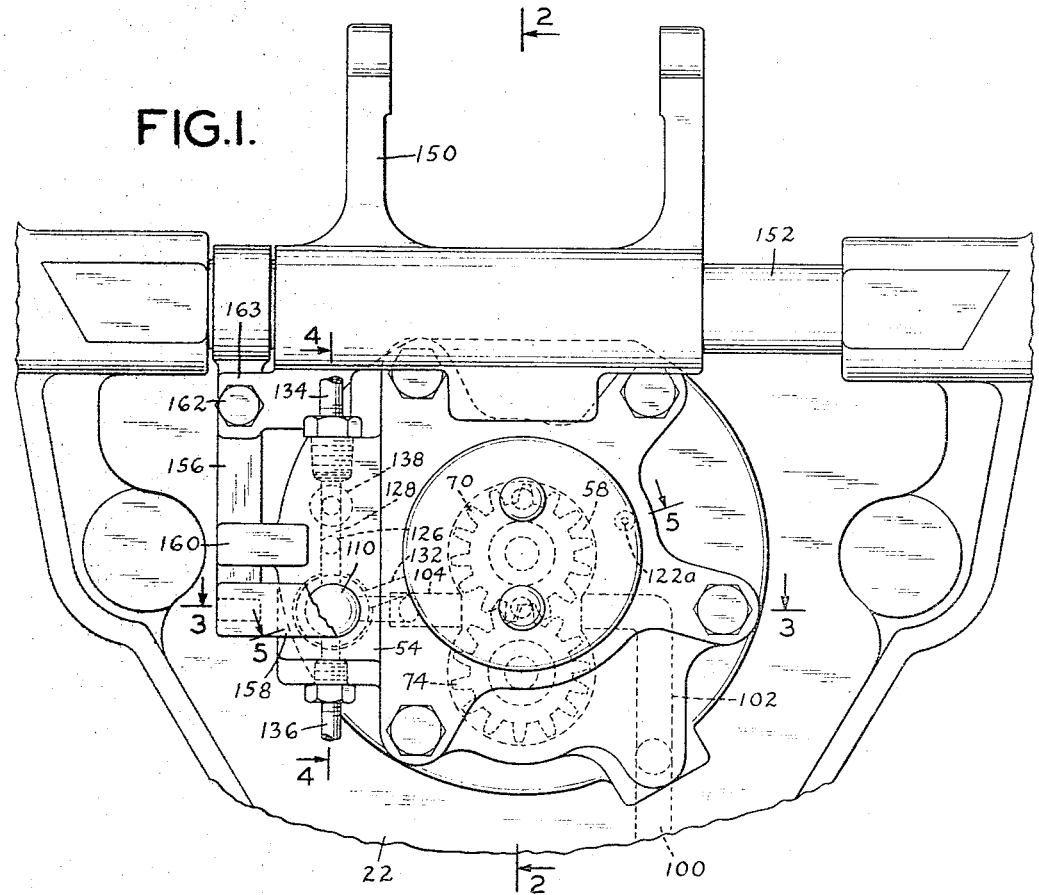
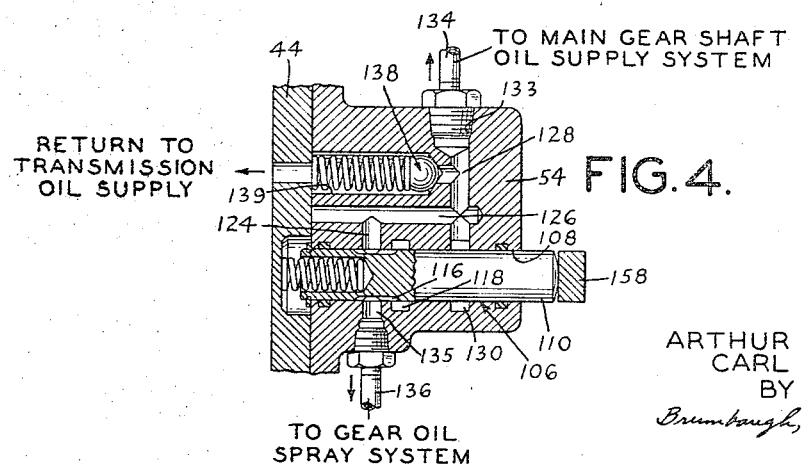
INVENTORS:
ARTHUR L. STEPANSKY
CARL J. GUSTAFSSON
BY
THEIR ATTORNEYS

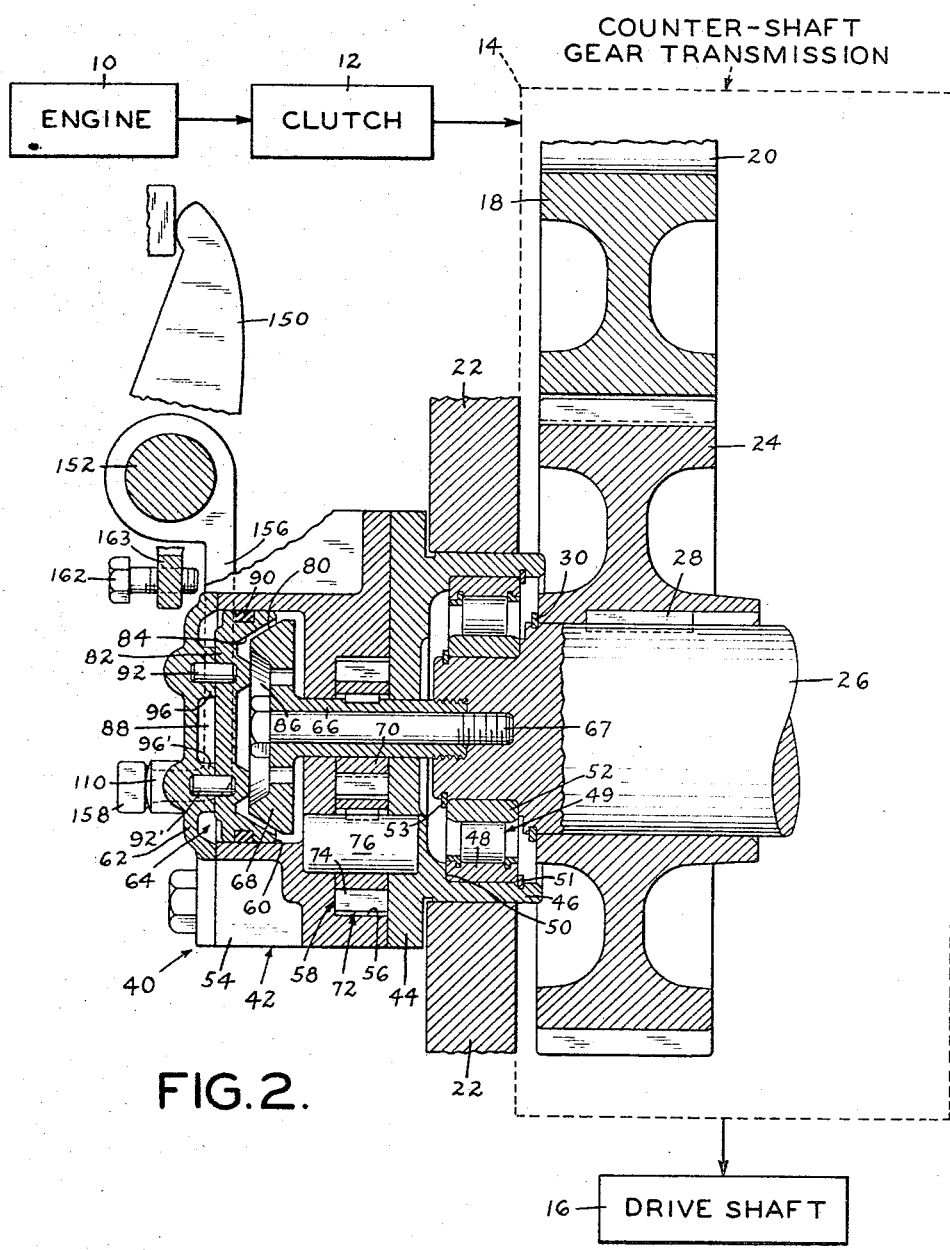

March 21, 1967    C. J. GUSTAFSSON ETAL    3,309,934
GEAR TRANSMISSION OIL PUMP AND COUNTERSHAFT BRAKE MECHANISM
Filed June 10, 1964    3 Sheets-Sheet 3

INVENTORS:
ARTHUR L. STEPANSKY
CARL J. GUSTAFSSON
BY
Brumbaugh, Free, Graves &
Donohue
THEIR ATTORNEYS

United States Patent Office

3,309,934
Patented Mar. 21, 1967

3,309,934
GEAR TRANSMISSION OIL PUMP AND COUNTERSHAFT BRAKE MECHANISM
Carl J. Gustafsson, Landskrona, Sweden, and Arthur L. Stepansky, Hagerstown, Md., assignors to Mack Trucks, Inc., Plainfield, N.J., a corporation of New York
Filed June 10, 1964, Ser. No. 373,934
8 Claims. (Cl. 74—339)

This invention relates to transmissions for vehicles and, more particularly, to a novel and improved combination oil pump and hydraulically operated countershaft brake whereby lubricating oil is supplied under pressure to the moving parts of a vehicle power transmission and the countershaft of a countershaft gear system is selectively braked to facilitate shifting the gears.

In presently known manually shifted gear transmissions, particularly those of the non-synchronized type and those which are used for heavy duty vehicles such as trucks and buses, the slowing of the gears to enable upshifting is usually accomplished by double clutching. In gear transmissions in which synchronizing mechanisms are employed, the shifting of the gears without double clutching may be ineffective because of the heavy loads on the synchronizing elements and also wears out those elements very rapidly. Accordingly, even synchronized gear transmissions are usually double-clutched during shifting. In the case of non-synchronized gear transmissions, double clutching is generally required in upshifting.

More particularly, conventional countershaft gear transmissions include a main gear pinion meshing with a main gear mounted on a countershaft. The countershaft and main shaft carry several gears providing for the various gear ratios in the transmission, which in the case of large trucks may number ten or more. In shifting, the disengagement of the clutch and movement of the gears to their neutral positions disconnects the transmission from both the engine and the main drive shaft to the wheels, but the gears continue to turn due to inertial forces. To slow down the countershaft and the gears to enable a higher ratio gear to be engaged, the clutch is briefly reengaged to enable the engine to provide the required braking of the transmission elements, thereby enabling the engagement of the higher ratio gear. When the clutch is again disengaged, the desired gear may then be shifted into the drive train.

Double clutching, while effective to accomplish upshifting, requires considerable skill on the part of the operator if it is to be accomplished smoothly, without loss of momentum of the vehicle, and with a minimum of strain on transmission parts. Additionally, double clutching results in greatly increased clutch wear.

Another problem in gear transmissions is the provision of effective lubrication of the moving parts to ensure a minimum of wear and a maximum efficiency of power transmission. The most usual lubrication system, particularly in relatively lightly loaded gear transmissions, is a splash system, wherein several of the gears move through oil contained in the transmission case and splash the oil throughout the case to lubricate all of the moving parts therein. Various pressure systems have been used in heavy duty gear transmissions.

There is provided, in accordance with the invention, a novel and improved combination oil pump-countershaft brake mechanism comprising an oil pump driven by the countershaft of the gear transmission, which provides oil under pressure which is supplied to the gear transmission through channeling in the transmission shafts to lubricate the bushings of rotatable gears and by means of conduits leading to openings in the transmission housing to spray oil onto the gears to lubricate them, and a countershaft brake, also coupled to the countershaft, which is operated by the oil pressure from the pump.

More particularly, an oil pump-countershaft brake mechanism, in accordance with the invention, comprises a pump which receives oil from a supply reservoir, such as oil contained in the transmission housing, and which is driven by the countershaft of a gear transmission. Also coupled to the countershaft is a first brake member which is disposed in a pressure chamber. A piston disposed in the chamber has a cooperating brake member thereon and is selectively urged toward the first brake member to engage the brake members by oil under pressure supplied from the pump. Preferably, the pressure to move the piston is provided to the chamber through a valve actuated by the clutch lever, so that when the clutch is disengaged, an additional depressing of the clutch pedal will operate the valve to provide a force on the piston to urge the brake members into engagement and apply the countershaft brake.

For a better understanding of the invention, reference may be made to the following description of an exemplary embodiment, taken in conjunction with the accompanying figures of the drawings, in which:

FIG. 1 is an end elevational view of the oil pump-countershaft brake mechanism, which is coupled to a gear transmission and actuated by a clutch lever;

FIG. 2 is a side elevational view in section of the pump-brake of FIG. 1 taken generally along line 2—2 of FIG. 1 and in the direction of the arrows, portions being broken away from clearer illustration;

FIG. 4 is a side view in section showing the arrangement of the oil pressure distributing system and an actuating valve for the brake taken generally along the line 4—4 of FIG. 1.

Figure 3:
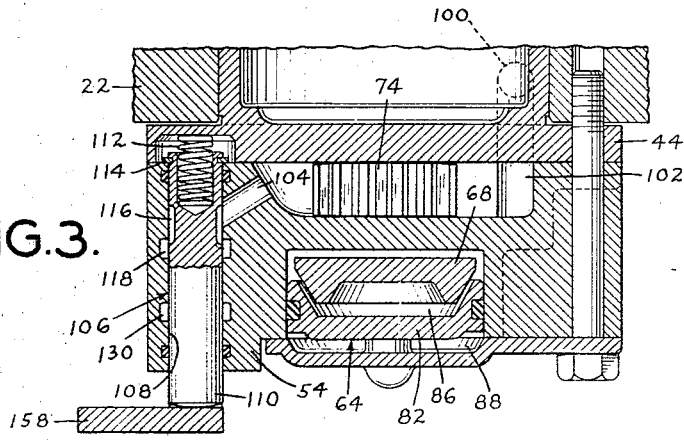
FIG. 3 is a top view in section taken generally along the line 3—3 of FIG. 2.

The pump-brake mechanism, in accordance with the invention, is preferably utilized in the power transmissions of motor vehicles, and particularly heavy duty vehicles such as trucks and buses. Referring to FIG. 2, the vehicle engine 10 is coupled by the transmission, which includes a clutch 12 and a multispeed type gear transmission 14, to the main drive shaft 16. The engine 10, clutch 12 and gear transmission 14 may be of any conventional types, many of which are well known to those skilled in the art, and therefore will not be described in detail herein.

The multispeed gear transmission includes a main drive pinion 18 secured on a shaft 20 which is journaled in bearings (not shown) in a housing 22. The main drive pinion 18 meshes with a main countershaft gear 24 mounted on a countershaft 26 fixed in position thereon by a key 28 and a snap ring 30.

A pump-brake mechanism 40 coupled to the transmission includes a housing 42 having a base 44 which is provided with an annular flange 46 at its end. The flange is installed in an opening in the gear transmission housing 22, and the inner face of the flange 46 receives the outer race 48 of a countershaft bearing 49, the race 48 being engaged against a shoulder 50 on the base 44 and held in place by a snap ring 51. The inner race 52 of the bearing 49 is held on the end of the countershaft 26 by snap ring 53.

Installed on the base 44 of the pump-brake housing 42 is a body member 54 having a recess 56 formed at its inner end which defines with the outer surface of the base plate 44 a gear pump chamber 58. The chamber 58 has a shape resembling the Arabic numeral eight (8), as best shown in FIG. 1. At the outer end of the body member 54 of the housing 42 is a cylindrical recess 60. A cover plate 62 on the outer end of the housing 40 closes the recess 60 to form a pressure chamber 64.

Extending through the base 44 and body member 54 and threaded into the end of the countershaft 26 is a gear pump shaft 66 which is provided with a brake member 68 at its outer end. The shaft 66 is locked on for rotation with the countershaft by a cap screw 67. A drive gear 70 of a gear pump 72 is keyed on shaft 66, and a driven gear 74 of the gear pump 72 is keyed on a shaft 76 journaled in the pump-brake housing 42. The gear pump 72 is disposed in the chamber 58 in the housing body member 54, the chamber 58 closely fitting the gears 70 and 74 on their surfaces and over the major portion of their perimeters. However, some space is left on either side of the mesh between the gears 70 and 74 to provide the inlet and outlet for the gear pump, as shown in FIG. 1.

The brake member 68 on the gear pump shaft 66 is disposed in the pressure chamber 64 and includes a generally frusto-conical brake surface 80 about its perimeter. Also disposed in the pressure chamber 64 is a piston 82 which is provided with a complementary, frusto-conical brake surface 84. The piston 82 divides the pressure chamber 64 into an inner compartment 86 and an outer compartment 88, and a seal 90 is provided about the perimeter of the piston 82 to prevent the communication of oil between the compartments 86 and 88. The piston is movable axially with respect to the countershaft 26, so that the brake surfaces 80 and 84 can selectively be engaged, and is restrained from rotational movement by means of pins 92 and 92' secured on the piston and loosely fitting into holes in bosses 96 and 96' on the cover plate 62 so that it can provide the braking action.

Referring now to FIGS. 1 and 3 to 5, oil from the transmission housing is supplied to the pump chamber 58 of pump-brake mechanism through channeling 100 in the housing wall 22 and a passageway 102 formed in the pump-brake housing 42 to the inlet space adjacent one side of mesh between the gears 70 and 74, as best shown in FIGS. 1 and 3. The oil is discharged from the pump chamber through an orifice 104 adjacent the other side of the gear mesh to a valve arrangement 106, which includes a bore 108 having a cylindrical valve member 110 disposed therein.

Figure 5:
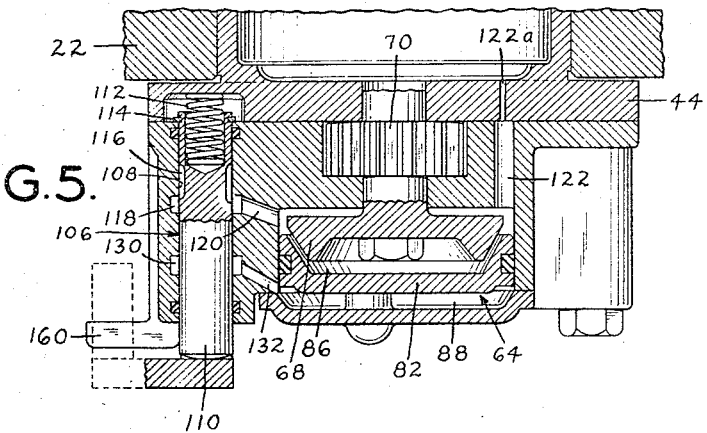
FIG. 5 is a view in section taken generally along the line 5—5 of FIG. 2.

The valve member 110 is normally urged outwardly by a spring 112 and is restrained in a predetermined extended position by a snap ring 114 which bears against the inner face of housing body member 54. The gear pump discharge orifice 104 leads to an annular groove 116 in the valve member 110, which in turn communicates with a first groove 118 formed in the housing body member 54, as best shown in FIG. 5. The first groove 118 communicates through a passage 120 with the inner compartment 86 of the pressure chamber. The inner compartment 86 includes an outlet passageway 122 which has a restricted portion 122a to limit the flow of oil out of the compartment and thereby maintain pressure therein when desired. The outlet passageway 122 enters the recess in the housing base member 22, thereby supplying lubricating oil to the countershaft bearing 30 when the valve member 110 is in its inner position, as will be described in more detail hereinafter, so that the annular groove 118 no longer communicates with the outlet 104 from the gear pump. Further, the passage 122 permits oil to drain from the inner compartment of the pressure chamber when the valve is closed.

The oil distribution arrangement further comprises a vertical passage 124 which is arranged to be open to the annular groove 116 and valve 110 in both its open and closed positions. The passage 124 leads into a longitudinally extending passage 126, and passage 126 is connected to another vertical passage 128, the lower end of which enters an annular groove 130 in the body member 54. As shown in FIG. 5, a passage 132 communicates the groove 130 with the outer compartment 88 of the pressure chamber. The upper end of the vertical passage 128 enters a tap 133 which receives a conduit 134 for supplying oil to channeling (not shown) in the main gear which forms a part of the lubrication system for the transmission. A second conduit 136 is connected to a tap in a passage 135 leading from the annular groove 116 in the valve member 110.

The valve arrangement and fluid pressure distribution system also includes a pressure relief valve 138 which is disposed in a pasage 139 extending through the pump-brake housing 42 and leading into the gear transmission. Excessive pressure is relieved by the discharge of oil through the valve 138 back to the transmission oil supply.

As previously mentioned, the oil distribution system includes conduits 134 and 136 which, it will be noted, are always in communication with the oil pump. The conduit 134 is coupled to a main gear shaft oil supply system for providing lubrication to the bushed gears mounted on the shaft. Additionally, the conduit 134 may be connected to an oil supply system for other shafting in the gear transmission. The shaft oil supply systems are not described in detail herein, since suitable arrangements are well known to those skilled in the art and may readily be adapted to the pump-brake system disclosed herein. Similarly, a suitable system known to those skilled in the art may be coupled to the conduit 136 for spraying oil onto the gears through orifices formed in the gear transmission housing 22.

Referring now to FIGS. 1 and 2, the clutch 12 is actuated by a lever system which includes a lever arm 150 fixedly mounted on a shaft 152 to which the clutch pedal is attached. Rotatably mounted on the shaft 152 of the clutch lever system is a valve actuating arm 156 which extends downwardly and then laterally so that the outer end of the valve member 110 bears against the inner face of a lateral extension 158 thereof. A stop member 160 limits the outward movement of the arm 156 so that it will not be carried with the shaft 152 beyond a predetermined position. Upon counterclockwise rotation (with respect to FIG. 1) of the shaft 152 an adjustable cap screw 162 installed in a tab 163 on the arm 150 contacts the arm 156 and presses it toward the valve member 110 which is thereby moved to its inner position in the bore 108, thus cutting off communication of oil pressure to the inner compartment 86 of the pressure chamber.

In operation of the vehicle, the countershaft 26 is driven by the main pinion 18 in a clockwise direction (with respect to FIG. 1) which in turn drives the gear pump 72 and pumps oil under pressure through discharge orifice 104. When the valve 106 is in its normal open position, the clutch being engaged and the actuating arm 156 being disengaged from the valve member 110, oil under pressure is supplied to the annular groove 116 and thence through passage 120 to the inner compartment of the pressure chamber. As previously mentioned, the oil distribution passages 124, 126 and 128 are always in communication with the gear pump distribution orifice 104, regardless of whether the valve is open or closed. Therefore, with the valve in an open position, equal pressure is supplied to the inner compartment 86 and outer compartment 88 of the pressure chamber, and no biasing force is exerted on the piston. Accordingly, the countershaft brake is disengaged in normal operation of the vehicle.

When it is desired to shift the gears, the clutch is disengaged by depressing the clutch pedal (not shown) to a predetermined extent, and the gear shift lever (not shown) is moved to neutral position. Therefore, the countershaft is free from any driving force, either from the engine 10, inasmuch as the clutch 12 is disengaged, or from the drive shaft 16. Nevertheless, it will continue to turn due to inertial forces.

To retard the rotation of the countershaft to the desired extent, the clutch pedal is depressed further to rotate the actuating shaft 152 and the lever arm 150 an additional increment (counterclockwise with respect to FIG. 2) and bringing the capscrew 162 into contact with the valve actuating arm 156 and moving the arm to the right. The extension 158 on the arm 156 urges the valve member 110 into its inner, valve-closing position. Accordingly, as will be observed in FIG. 5, the oil supply to the inner compartment 86 is terminated, and no oil pressure is supplied to the inner compartment 86 of the pressure chamber 64. Pressure in the inner compartment is therefore quickly reduced by the bleeding of oil through the outlet passage 122 and through the restriction 122a. When the pressure in the inner compartment drops, the pressure which continues to exist in the outer compartment 88 drives the piston 82 toward the brake member 68 and engages the respective brake surfaces 80 and 84 on the piston and on the brake member. Accordingly, the rotation of the countershaft is retarded. The clutch pedal may then be partially released, allowing the arm 156 to withdraw so that the valve member 110 can be urged by the spring 112 into its open position, thereby supplying oil once again to the inner compartment 86 of the pressure chamber. This will create equal pressures in the inner and outer compartments of the pressure chamber and disengage the brake. The shift lever is then moved to engage the desired gear, and the clutch pedal fully released.

Thus, there is provided, in accordance with the invention, an oil pump-countershaft brake mechanism which is compact in size and structure and provides improved lubrication for the moving parts of a vehicle transmission and enables more efficient, easier and safer operation of the vehicle by eliminating the need for double-clutching. Moreover, maintenance costs for the clutch and gear transmission are very significantly reduced by the pump-brake mechanism, and it can be constructed and installed at relatively low cost. It operates at any time the transmission is turning, being coupled directly to the transmission countershaft, preferably, though not necessarily, without belt drives or the like which are subject to slip or breaking.

It will be understood by those skilled in the art that the above described embodiment of an oil pump-countershaft brake mechanism is susceptible of considerable modification and variation without departing from the spirit and scope of the invention. Such variations and modifications are intended to be within the scope of the invention as defined in the appended claims.

We claim:

1. A countershaft brake mechanism for vehicles having a clutch and a gear transmission having a countershaft, comprising means defining a pressure chamber, first frictional brake means operably coupled to said countershaft and disposed in said chamber, a piston disposed in said chamber for movement toward and away from said brake means, means coupled to said piston to impede the rotation thereof, second frictional brake means on said piston and movable therewith into engagement with said first brake means to retard the rotation of said countershaft, oil pump means operably coupled to said countershaft, and means responsive to operation of said clutch for selectively supplying oil under pressure from said pump to said chamber to move said piston toward said first brake means and engage said second brake means therewith.

2. A combination oil pump and countershaft brake mechanism for a gear transmission having a countershaft comprising gear pump means operably coupled to said countershaft, inlet means for supplying oil to said gear pump means, outlet means for discharging oil under pressure from said gear pump means, a pressure chamber, a piston disposed in said chamber and dividing it into a first compartment and a second compartment, a first frictional braking member disposed in said first compartment and coupled to said shaft and rotatable therewith, a second frictional braking member on said piston, said piston being movable in said chamber to engage said first and second braking members, means restraining said second braking member from rotation to retard rotation of said shaft when said braking members are engaged, means for supplying oil under pressure from said outlet means to said first and second compartments, and means for selectively creating a pressure differential between said first and second compartments effective to urge said piston toward said first braking member.

3. A mechanism as claimed in claim 2, wherein said means for supplying oil to said compartments comprises first passage means communicating said outlet to said first compartment, second passage means communicating said outlet to said second compartment, and valve means in said first passage means for selectively closing said first passage means.

4. A mechanism as claimed in claim 2, wherein said first compartment includes a restricted outlet orifice.

5. A mechanism as claimed in claim 4, wherein said countershaft is mounted in bearings and said restricted orifice communicates said shaft bearings with said first compartment to provide oil for lubricating said bearings.

6. A mechanism as claimed in claim 2, wherein said braking surfaces are frusto-conical.

7. In a mechanical power transmission system having a clutch, clutch lever means for selectively engaging and disengaging the clutch and a countershaft gear arrangement which includes bearings, gears and a rotatable countershaft disposed in a housing, the combination therewith of an oil pump and countershaft brake mechanism, comprising gear pump means operably coupled to the countershaft, means for supplying oil to said gear pump means, outlet means for discharging the oil under pressure from said gear pump means, a pressure chamber, a piston disposed in said chamber and dividing it into a first compartment and a second compartment, a first brake member having a frictional brake surface disposed in said first compartment and coupled to the countershaft for rotation thereby, a second frictional brake surface on said piston means, said piston means movable toward and away from said first brake member to selectively engage and disengage said first and second brake surfaces, means for restraining said piston means against rotation to retard the rotation of said countershaft when said braking surfaces are engaged, means operable by the clutch lever means for supplying oil under pressure from said gear pump outlet to said first and second compartments, and means for selectively reducing the pressure of the oil in said second compartment to a value below the pressure of the oil in the first compartment and thereby create a pressure differential between said first and second compartments effective to urge said piston toward said first brake member to engage said brake surfaces.

8. A mechanism as claimed in claim 7, further comprising means for supplying the oil under pressure from said outlet of said gear pump to the gears and bearings of the gear arrangement.

References Cited by the Examiner

UNITED STATES PATENTS 1,851,571   3/1932   Doman _____ 74—339

DAVID J. WILLIAMOWSKY, *Primary Examiner.*

H. S. LAYTON, *Assistant Examiner.*